United States Patent
Scurlock et al.

(10) Patent No.: US 6,814,775 B2
(45) Date of Patent: Nov. 9, 2004

(54) SINTERED COMPACT FOR USE IN MACHINING CHEMICALLY REACTIVE MATERIALS

(75) Inventors: Robert Dean Scurlock, Johnstown, OH (US); Stephen Lee Dole, Westerville, OH (US)

(73) Assignee: Diamond Innovations, Inc., Worthington, OH (US)

( * ) Notice: Subject to any disclaimer, the term of this patent is extended or adjusted under 35 U.S.C. 154(b) by 0 days.

(21) Appl. No.: 10/437,516

(22) Filed: May 14, 2003

(65) Prior Publication Data

US 2004/0002418 A1 Jan. 1, 2004

Related U.S. Application Data

(60) Provisional application No. 60/391,707, filed on Jun. 26, 2002.

(51) Int. Cl.[7] .................................................. C22C 29/16
(52) U.S. Cl. .............................. 75/244; 75/238; 419/12; 419/13; 419/14; 419/48; 51/307; 51/309; 501/87; 501/96.4
(58) Field of Search ...................... 75/238, 244; 419/12, 419/13, 14, 48; 51/307, 309, 87, 96.4

(56) References Cited

U.S. PATENT DOCUMENTS

| | | | |
|---|---|---|---|
| 2,947,617 A | 8/1960 | Wentorf Jr. et al. ............ 51/307 |
| 3,136,615 A | 6/1964 | Bovenkerk et al. ............ 51/307 |
| 3,233,988 A | 2/1966 | Wentorf Jr. et al. ........... 51/307 |
| 3,743,489 A | 7/1973 | Wentorf Jr. et al. ........... 51/307 |
| 3,767,371 A | 10/1973 | Wentorf Jr. et al. ........... 51/307 |
| 3,852,078 A | 12/1974 | Wakatsuki et al. ............. 106/43 |
| 3,876,751 A | 4/1975 | Alexeevsky et al. ......... 423/290 |
| 3,918,219 A | 11/1975 | Wentorf Jr. et al. ........... 51/307 |
| 3,918,391 A | 11/1975 | De Vries et al. ................ 51/37 |
| 4,188,194 A | 2/1980 | Corrigan ....................... 51/307 |
| 4,343,651 A | 8/1982 | Yazu et al. .................... 75/238 |
| 4,911,756 A | 3/1990 | Nakaj et al. ................... 75/238 |
| 5,041,399 A | 8/1991 | Fukaya et al. ................. 501/87 |
| 5,092,920 A | 3/1992 | Nakaj et al. ................... 75/238 |
| 5,200,372 A * | 4/1993 | Kuroyama et al. ......... 501/96.4 |
| 5,569,862 A * | 10/1996 | Kuroyama et al. ............ 75/238 |
| 6,316,094 B1 | 11/2001 | Fukaya et al. ............... 428/323 |

* cited by examiner

*Primary Examiner*—Ngoclan T. Mai
(74) *Attorney, Agent, or Firm*—Pepper Hamilton LLP

(57) ABSTRACT

A sintered cubic boron nitride (cBN) compact for use in a tool is composed of between about 60 and 80 vol-% cBN having a volumetric mean particle size of between about 3 to 6 μm and between about 40 and 20 vol-% of a ceramic binder phase. The ceramic binder is composed of between about 20 and 60 vol-% of one or more of a carbide, nitride, or boride of a Group IVB or VIB metal, and between about 40 and 80 vol-% of one or more of carbides, nitrides, borides, or oxides of aluminum. The cBN compact additionally contains between about 3 and 15 wt-% tungsten. The cBN compacts are especially useful in machining iron and like chemically reactive parts, especially where such parts are powder metal parts.

19 Claims, 1 Drawing Sheet

SINTERED COMPACT FOR USE IN MACHINING CHEMICALLY REACTIVE MATERIALS

CROSS-REFERENCE TO RELATED APPLICATIONS

This application claims priority on U.S. Provisional Application Ser. No. 60/391,707, filed on Jun. 26, 2002.

FIELD OF THE INVENTION

The present invention relates to cutting, milling, and turning tools and more particularly to improving the performance of cubic boron nitride (cBN) superabrasive tools for material removal operations.

BACKGROUND OF THE INVENTION

The manufacture of cBN by the high pressure/high temperature (HP/HT) process is known in the art as described in U.S. Pat. Nos. 2,947,617. 4,188,194 describes a process for making sintered polycrystalline cBN compacts, which utilizes pyrolytic hexagonal boron nitride (PBN) in the absence of any catalyst. An improvement on such direct conversion process is disclosed in U.S. Pat. No. 4,289,503, wherein boric oxide is removed from the surface of the HBN powder before the conversion process.

A compact is a mass of abrasive particles bonded together in a self-bonded relationship, by means of a bonding medium, or by means of combinations thereof. A composite compact is a compact bonded to a substrate material, such as cemented metal carbide. U.S. Pat. No. 3,918,219 teaches the catalytic conversion of hexagonal boron nitride (HBN) to cBN in contact with a carbide mass to form a composite cBN compact. Compacts or composite compacts may be used in blanks for cutting tools, drill bits, dressing tools, and wear parts.

Polycrystalline cBN compacts often are used in machining hard ferrous alloy workpieces. Tool hardness and mechanical properties must be balanced against tool reactivity. High cBN content compacts provide the highest hardness, but, generally, are reactive towards alloy steels. To provide utility, non-reactive phases often are added to protect the cBN from reacting with ferrous alloys.

There are a number of references teaching various compositions for high pressure and temperature sintered bodies made from cubic boron nitride (cBN) and transition metal nitrides or carbides.

U.S. Pat. No. 4,334,928 describes sintered bodies containing 20–80 volume-% cBN and a binder phase consisting of carbides, nitrides, carbo-nitrides, suicides, or borides of the metals in groups IV and V of the periodic table. The addition of aluminum to the binder phase also is included. The Ti compounds added to the mixture preferably have a stoichiometry such that the value of "z" is less than 0.97 for the general formula: $Ti(X)_z$ where "X" is carbon or nitrogen or combinations of the two.

U.S. Pat. No. 4,343,651 describes sintered bodies wherein the material contains 80–95% by volume cubic boron nitride.

U.S. Pat. No. 4,911,756 describes sintered bodies made from a sinter mix that contains 50–75 volume-% cBN and 25–50 volume-% of a binder phase. The binder phase consists of 20–50 weight-% Al or Al compounds, carbides, nitrides, carbo-nitrides, silicides, or borides of the metals in groups IV, V and VI of the periodic table (including Ti and W), wherein the Ti compounds added are stipulated to have a stoichiometry such that the value of "z" is within the range of 0.5 to 0.85 for the general formula: $Ti(X)_z$ where "X" is carbon or nitrogen or combinations of the two.

U.S. Pat. No. 5,092,920 describes sintered bodies with 45–0 volume-% cBN with average particle size of 2 microns or less with a binder phase comprised of 5–15 weight-% of aluminum, 2–20 weight-% of tungsten, and the remainder being any of the prior mentioned Ti compounds, where the stoichiometry of the Ti compounds is such that the value of "z" is within the range of 0.45–0.65 for the general formula: $Ti(X)_z$ where "X" is carbon or nitrogen or combinations of the two.

U.S. Pat. No. 6,316,094 describes sintered bodies comprised of 45–70 volume-% cBN with a grain size of 2 to 6 microns with a 2-dimensionally continuous binding phase comprised of at least one of the following: a carbide, nitride, carbo-nitride, or boride of a group IVB, VB or VIB transition metal (including Ti and W), a nitride, boride, or oxide of aluminum, a carbide, nitride, carbo-nitride or boride of iron, cobalt, or nickel, and solid solutions thereof. It is also stipulated that the binder phase has an average thickness of 1.5 microns or less with a standard deviation of 0.9 microns or less.

Thus, while improvements have been realized by the foregoing approaches, an optimized product is required for each chemical class of alloy materials to be machined. Increased development costs and product line support costs add to the cost of such cBN machining products. Applicants have found an optimized sintered compact composition comprising tungsten compounds and cBN grains having a volumetric mean particle size of greater than 2 microns, for an improved machining performance.

BRIEF SUMMARY OF THE INVENTION

The sintered compact of the present invention is obtained by sintering a mixture of about 60–80 percent by volume of cubic boron nitride (cBN) with the cBN grains have a volumetric mean particle size between 3 and 6 μm, about 20–40 vol-% of a ceramic binder phase under high pressure and temperature conditions; wherein the binder phase is between about 20 and 60 vol-% of one or more of carbides, nitrides, or borides of the metals of groups IVB and VIB of the periodic table, and between about 40 and 80 vol-% of one or more of carbides, nitrides, borides, or oxides of aluminum; and about 3 to 15 wt % tungsten. Other Iron group metals, in the form of a carbide or boride also may be present as impurities introduced by processing.

The present invention further relates to forming tools comprising cBN compacts containing a mixture of about 60–80 percent by volume of cubic boron nitride (cBN) with the cBN grains have a volumetric mean particle size between 3 and 6 μm, about 20–40 vol-% of a ceramic binder phase, and about 3 to 15 wt-% tungsten.

DETAILED DESCRIPTION OF THE INVENTION

Figure 1:
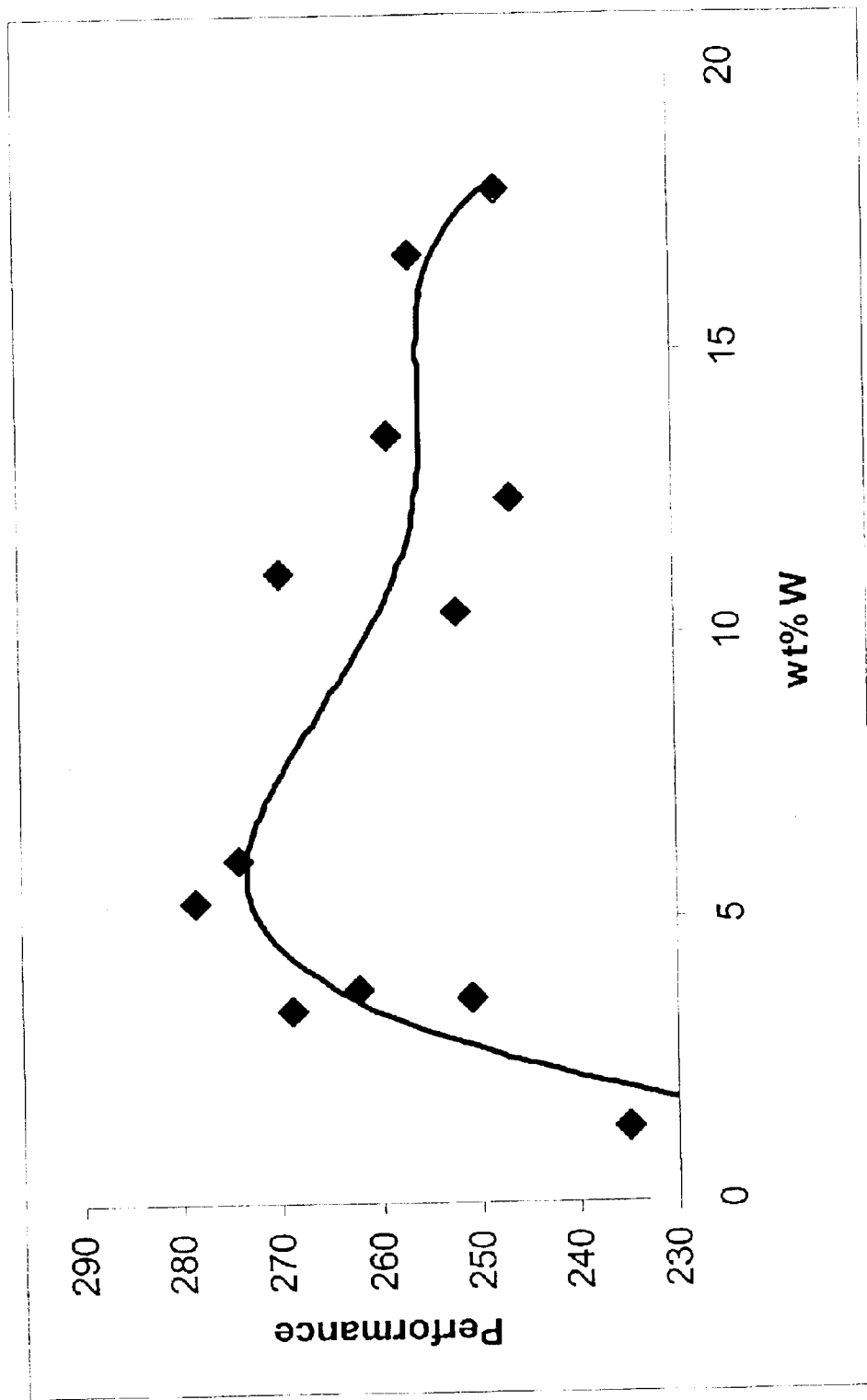
FIG. 1 is a plot showing the machining performance of one embodiment of the sintered cBN compact of the invention, as a function of their W content.

The novel cBN compacts are especially useful in forming tools, such as are used in the machining of workpieces. Of special note is the utility that the inventive cBN compacts have in machining chemically reactive materials in one embodiment of the invention.

By "chemically reactive materials" is mean materials that chemically react with the tool material, such as, for example, ferrous workpieces that react with diamond tools at elevated temperature. More remarkable is the ability of the inventive sintered cBN compacts to machine powder metal parts, i.e., parts made from powder metals that are consolidated or densified to form workpieces or parts, and especially parts densified from iron powder by powder metal processing.

The sintered cBN compacts of the present invention demonstrate excellent performance in machining chemically reactive materials, such as, for example, powder metal iron. In particular, the inventive cBN sintered compacts excel in machining powder metal parts (parts manufactured by consolidation of metal powder), such as now are common in the automotive industry, e.g., gears, valve seats, etc. The metric comparing the inventive cBN sintered compacts is the useful life of the tool, which is determined by the quantity of machining it can complete before the surface finish of the machined metal becomes unacceptable. The inventive cBN sintered compacts have tested and found in one embodiment, to perform better than commercial compacts by a factor of more than 2 to 1.

In manufacturing the inventive sintered cBN compacts, feedstock powder can be milled to the desired particle size and mixed by a variety of techniques, including, for example, ultrasonic mixing, ball mill mixing, attrition mill mixing, and the like. An apparent influence exerted by the mixing technique of choice is the addition of metal from the metal balls (e.g., W from W media). Unintended metal or other media may be added to the mix, which may not be desired. Alternatively, desired material may be introduced into the feedstock mix by this technique. For example, since W is desired in the final feedstock mixture, milling with W media to add W may be the technique of choice to introduce at least a fraction of the W content.

Milling often is accomplished in the presence of a solvent such as, for example, alcohols, acetones, and like solvents that can be readily removed and do not promote undesirable oxidation of the metal powders being milled. Such milling usually does not result in the oxidation of the powders to any undesirable degree. Milling temperatures will be ambient and times can range up to several hours. Adjusting the size of the ball milling apparatus proportionately can make blended mixtures ranging in size from 100 g to 2 kg, or larger.

The blended mixture next is dried to remove the solvent (e.g., isopropyl alcohol, acetone) at a temperature below the flash point of the solvent. The dried powder then is lightly milled in a dry state by placing an amount of the powder in an appropriately sized contained with WC or other milling media of the same weight as the powder and then tumbled in the bottle. The powder subsequently is sieved to size. The composition of the blended material can be modified so that the relative contents of the ingredients adhere to the ranges desired.

The powder now is ready for sintering using conventional HP/HT techniques and apparatus well known in the art, such as described above. Briefly, the powder is loaded in refractory metal cups (e.g., Ta or Nb). The size of the cups limits the size of the final sintered compact. A support material (powder or compact) can be loaded into the cup for in situ bonding to the sintered cBN compact, as is known in this art. Suitable substrates include, for example, refractory metal (e.g., W) carbides. Crimping the cup material around the edges of the substrate seals the cup.

This finished blank then is loaded into a high pressure cell which consists of pressure transmission and pressure sealing materials and then subjected to high pressure (e.g., 45–50 kbars) and high temperature (about 1400° C.) for 30–40 minutes to sinter the powder mixture and braze it to the substrate. The sintered blank is removed from the cell and machined to remove the cup material and to bring it to the desired dimensions. The finished blank is sufficiently electrically conductive that it can be cut by electro-discharge machining (EDM) into shapes and sizes suitable for the manufacture of cutting tools used for machining powder metal iron and other similar materials. The size and shape of the described sintered blanks can be varied by changing the dimensions of the components and are primarily limited in dimension by the high pressure/high temperature (HP/HT) equipment used to promote the sintering process.

The sintered cBN compact product comprises between about 60 and 80 vol-% cBN grains with mean size of about 3–6 microns ($\mu$m) with the remainder of the material consisting of the binder phase, which is uniformly dispersed among the cBN grains and which contains stoichiometric carbides, nitrides, or borides.

In one embodiment of the invention, the binder phase contains several phases that can be identified by X-ray diffraction techniques including, for example, aluminum nitride, titanium carbide, titanium nitride, titanium boride, tungsten carbide, tungsten boride, and a compound of tungsten, boron and cobalt. These phases are formed during the sintering process by reaction of the blended powder components.

The sintered cBN compact product further comprises between about 3 and 15 wt-% tungsten. At higher levels of tungsten, the cBN compact will still exhibit good machining performance, but may have a propensity to chip during the machining operation. This is attributed to the formation of the tungsten boride (WB) phase during the high pressure/high temperature sintering operation. The formation of the WB phase suppresses the formation of the titanium diboride ($TiB_2$) phase, as can be observed by X-ray diffraction of the final product.

It is believed that a sufficient amount of the titanium diboride phase is formed in one embodiment of the invention during the sintering to provide the optimum material. The higher levels of tungsten, thus, are somewhat detrimental because the possibility of chipping of the tool material during the machining operation is increased. In one embodiment of the invention, the W content ranges from between about 3 to 8 wt-%.

The level of tungsten in the sintered cBN compact product may be determined using X-ray diffraction. The intensities of the diffraction peaks from the (110) crystallographic planes of the tungsten boride phase can be compared to the intensities of the diffraction peaks from the (100) crystallographic planes of the titanium diboride phase. The intensity of the titanium diboride peak to the tungsten boride peak is in a ratio of about 2:1 or greater.

The sintered cBN compact, then, can be formed into a tool for machining chemically reactive materials, such as, for example, powder metal iron. The formation of such tools and the machining conditions used are well known in the art and well practiced commercially.

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

EXAMPLES

In the examples, standardized machining tests are conducted on an iron powder part (Z82, Keystone Powder Metal, St. Marys, Pa., 15857). This iron powder metal part contains various amounts of Al, Cr, Co, Cu, Mn, Ni, Si, and Ti. The standardized test procedure utilizes the following conditions:

TABLE 1

| Material | Z82 P/M Exhaust Rockwell B Hardness = 82 |
|---|---|
| Workpiece velocity | 1000 SFM (300 M/min.) |
| Feed rate | 0.004 ipr (0.10 mm/rev.) |
| Depth-of-cut | 0.008" (0.20 mm) |
| Vb Max | 0.010" (0.25 mm) |
| Test Measurements (Average of 3 tools) | Number of equivalent parts machined (EPM) |

Example 1—Comparative

The standardized machining test is conducted using a commercial cBN compact (BZN 6000, 90 vol-% cBN, 10 vol-% ceramic and metal phases, GE Superabrasives, Worthington, Ohio). This material tested at 130 EPM. The cBN content of this commercial product exceeds that content determined to be suitable for the inventive cBN sintered compact.

Example 2—Comparative

The standardized machining test is conducted using a commercial cBN compact (BZN 8200, 65 vol-% cBN, 33 vol-% sub-stoichiometric $TiN_x$ (where x<0.97), and 2 vol-% AlN, GE Superabrasives, Worthington, Ohio). The material is tested at 120 EPM. It should be noted that the sub-stoichiometric N content of the TiN is <1.

Example 3

Titanium aluminide ($TiAl_3$) powder with mean particle size less than about 2.5 microns, titanium carbide (TiC) powder with mean particle size less than 3 microns are blended with a cBN powder having a mean size of about 4–5 microns to form a mixture of about 77 weight-% cBN, 15 weight-% $TiAl_3$, and 8 weight-% TiC. The mixture is ball milled for 4 hours using conventional WC milling media (0.25 in diameter) and with isopropanol (IPA) as a milling fluid. The milling operation increases the WC content of the final powder mix to about 5 weight-%.

The blended mixture is dried to remove the alcohol at a temperature below the flash point of the alcohol. The dried powder is lightly milled in a dry state by placing an amount of the powder in an appropriately sized plastic bottle with WC milling media of the same weight as the powder and then tumbled in the bottle for 30 minutes. The powder is subsequently sieved through a 20-mesh screen. The processed powder mixture is loaded into refractory metal cups and covered with a tungsten carbide substrate. This cup assembly then is loaded into a high pressure cell, which consisted of pressure transmission and pressure sealing materials and then subjected to high pressure (45–50 kbars) and high temperature (about 1400° C.) for 30–40 minutes to sinter the powder mixture and braze onto a tungsten carbide substrate.

In the example, the sintered powder consists of about 75 volume-% cBN grains with mean size of about 4–5 microns with the remainder of the material consisting of the binder phase, uniformly dispersed among the cBN grains. The binder phase contains several phases identified by X-ray diffraction techniques to include aluminum nitride, titanium carbide, titanium nitride, titanium boride, tungsten carbide, and a compound of tungsten, boron and cobalt. These phases are formed during the sintering process by reaction of the blended powder components. Based on the weight-% of the powders added to the sinter mix and the reaction products observed by XRD, the binder phase of the sintered compact contains about 60 vol % aluminum compounds (predominantly nitrides and borides), and about 40 vol % titanium compounds (predominantly carbides and borides).

The sintered blank is machined to remove the cup material and to bring to the desired dimensions (3.2 mm thick and 59 mm diameter). The finished blank is sufficiently electrically conductive such that it can be cut by electro-discharge machining (EDM) into shapes and sizes suitable for the manufacture of cutting tools used for machining powder metal iron and other similar materials. The cBN sintered compact types are tested using the standardized machining test with the following results.

TABLE 2

| | Composition (wt) | | | Mill | | cBN | EPM |
|---|---|---|---|---|---|---|---|
| RUN | TiN | TiC | $TiAl_3$ | WC | Type | Solvent | ($\mu$) | (avg.) |
| 6 | 0 | 8.16 | 14.72 | 1.97 | Ball | Acetone | 4.5 | 278.7 |
| 15 | 0 | 8.16 | 14.72 | 1.97 | Ball | IPA | 4.5 | 274.3 |

The results demonstrate the excellent performance that the inventive sintered cBN compacts display, and that the type of solvent has no material affect on machining performance of the sintered cBN compacts.

Example 4

An additional cBN sintered compact is manufactured in the manner as described in Example 1 and tested using the standardized machining test, with the difference being in the particle size, i.e., the cNB particle size is only 3.0$\mu$. The following results are recorded.

TABLE 3

| | Composition (wt) | | | | cBN | EPM |
|---|---|---|---|---|---|---|
| RUN | TiN | TiC | $TiAl_3$ | WC | Mill Type | ($\mu$) | (avg.) |
| 1 | 0 | 8.16 | 14.72 | 1.97 | Ball | 3.0 | 248.8 |

These results reveal a diminution in performance by merely reducing the particle size of the cBN from 276.5 EPM (Example 3) to 248.8 EPM.

Example 5

An additional cBN sintered compact is manufactured in the manner as described in Example 1 and tested using the standardized machining test, with the formulation utilizing TiN in place of TiC, for the following results.

TABLE 4

| RUN | Composition (wt) | | | | Mill Type | cBN ($\mu$) | EPM (avg.) |
|---|---|---|---|---|---|---|---|
| | TiN | TiC | TiAl$_3$ | WC | | | |
| 17 | 4 | 0 | 19 | 0 | Attritor | 4.5 | 234.9 |

The results reveal a diminution in performance by merely replacing TiC with TiN.

Example 6

An additional cBN sintered compact is manufactured in the manner as described in Example 1 and tested using the standardized machining test, with TiN being converted to TiC during the sintering process, as determined by x-ray diffraction analysis, for the following results.

TABLE 5

| RUN | Composition (wt) | | | | Mill Type | cBN ($\mu$) | EPM (avg.)* |
|---|---|---|---|---|---|---|---|
| | TiN | TiC | TiAl$_3$ | WC | | | |
| 23 | 9.43 | 0 | 12.65 | 1.97 | Attritor | 4.5 | 269.9 |

Again, the improved performance realized by having TiC in the sintered CNB compact product is demonstrated.

Example 7

An additional cBN sintered compact is manufactured in the manner as described in Example 1 and tested using the standardized machining test, with the difference from Example 6 is that an attritor mill is used rather than a ball mill. The following results are recorded.

TABLE 6

| RUN | Composition (wt) | | | | Mill Type | cBN ($\mu$) | EPM (avg.)* |
|---|---|---|---|---|---|---|---|
| | TiN | TiC | TiAl$_3$ | WC | | | |
| 9 | 0 | 8.16 | 14.72 | 1.97 | Attritor | 4.5 | 250.7 |

The diminution in performance compared to Example 3 (278.7 EPM versus 250.7 EPM) can be attributed to the fact that the use of the attritor mill resulted in less WC being added to the formulation compared to the ball mill. The importance of the presence of WC in the formulation also is demonstrated.

Example 8

Additional sintered cBN compacts are formulated from the ingredients listed in the foregoing examples utilizing TiN, TiC, TiAl$_3$. The amount of W (supplied as WC) is varied in order to ascertain the affect that W has on machining performance, with the following results recorded for cBN particles ranging in size from 3 to 6 $\mu$m and as also illustrated in FIG. 1.

TABLE 7

| % W | EPM (avg) |
|---|---|
| 1.31 | 234.9 |
| 3.4 | 268.9 |
| 3.6 | 250.7 |
| 3.76 | 262.2 |
| 5.28 | 278.7 |
| 6.04 | 274.3 |
| 10.4 | 252.0 |
| 11.1 | 269.9 |
| 12.44 | 246.4 |
| 13.56 | 258.8 |
| 16.72 | 256.2 |
| 17.86 | 247.7 |

These data demonstrate that machining performance (as measured by machining powder metal, PM, iron parts) peaks at around 5 wt-% W, and that acceptable machining performance is obtained for sintered cBN compacts containing between about 3 and 15 wt-% W.

Example 9

Additional cBN sintered compacts with varying levels of WC are manufactured in the manner as described in Example 1 and tested using a more severe version of the standardized machining test (Rockwell B hardness of workpiece=95).

These powder blend samples and sintered compacts are analyzed for W content by ICP (inductive coupled plasma) and XRD (x-ray diffraction), respectively. The relative amount of W in the sintered compact is determined as the XRD intensity ratio of the [101] TiB$_2$ peak over the [110] WB peak. These data are provided in

TABLE 8

| Blank ID | Relative XRD Intensity of [101] TiB2 peak | Relative XRD Intensity of [110] WB peak | ICP % W | XRD Intensity Ratio WB/TiB2 |
|---|---|---|---|---|
| A | 49% | 6% | 6.5% | 0.12 |
| B | 46% | 10% | 6.5% | 0.22 |
| C | 51% | 0% | 5.0% | 0.00 |
| D | 47% | 0% | 5.0% | 0.00 |
| E | 48% | 0% | 5.0% | 0.00 |
| F | 47% | 6% | 4.0% | 0.12 |
| G | 50% | 0% | 4.0% | 0.00 |
| H | 50% | 4% | 4.2% | 0.08 |
| I | 49% | 0% | 4.0% | 0.00 |
| J | 46% | 5% | 4.4% | 0.10 |
| K | 39% | 32% | 10.7% | 0.81 |
| L | 39% | 33% | 10.3% | 0.85 |
| M | 39% | 34% | 10.5% | 0.89 |
| N | 50% | 30% | 10.6% | 0.61 |
| O | 38% | 32% | 9.0% | 0.85 |
| P | 34% | 35% | 8.8% | 1.04 |
| Q | 36% | 20% | 8.7% | 0.55 |

These samples can be seen to fall into two groups: those with W content<8 wt-% and XRD Intensity Ratio WB/TiB2<0.4 (samples A-J); and those with W content>8 wt-% and XRD Intensity Ratio WB/TiB2>0.4 (samples K-Q). When tools made from these groups are subjected to a more severe version of the standard PM machining test, tools made from the group with XRD Intensity Ratio WB/TiB2>0.4 (samples K-Q) fail by catastrophic chipping in 13 out of 13 tests, whereas the group with XRD Intensity Ratio WB/TiB2<0.4 fail in only 17 out of 25 tests.

The data demonstrate that a compact with reduced tendency for chipping is produced when W levels are below about 8 wt-% and the XRD Intensity Ratio WB/TiB2 is less than 0.4, when machining harder workpieces.

We claim:

1. A sintered cubic boron nitride (cBN) compact for use in a tool, which comprises:
   (a) between about 60 and 80 vol-% cBN having a volumetric mean particle size of between about 3 to 6 μm;
   (b) between about 20 and 40 vol-% of a ceramic binder phase, of which
      (i) between about 20 and 60 vol-% of one or more of carbides, nitrides, or borides of a Group IVB or VIB metals, wherein said one or more carbides, nitrides, or borides is a compound having the formula MXz, where M is a metal from Group IVB or VIB, X is a carbide, nitride or boride and z has a value >0.97;
      (ii) between about 40 and 80 vol-% of one or more of carbides, nitrides, borides, or oxides of aluminum; and
   (c) between about 3 and 15 wt-% tungsten.

2. The sintered cBN compact of claim 1, wherein the ceramic binder phase predominantly comprises titanium carbide.

3. The sintered cBN compact of claim 1, where the tungsten content is between about 3 and 8 wt-%.

4. The sintered cBN compact of claim 1, wherein said ceramic binder phase includes $TiB_2$, which $TiB_2$ is detectable by XRD.

5. The sintered cBN compact of claim 4, which contains WB, wherein the XRD Intensity Ratio of the [101] $TiB_2$ peak to the [110] WB peak is less than about 0.4.

6. Process for making a sintered cubic boron nitride (cBN) compact for use in a toot, which comprises subjecting to high pressure and high temperature (HP/HT) conditions a mixture of:
   (a) between about 60 and 80 vol-% cBN having a volumetric mean particle size of between about 3 to 6 μm;
   (b) between about 20 and 40 vol-% of a ceramic binder phase, of which
      (i) between about 20 and 60 vol-% of one or more of carbides, nitrides, or borides of a Group IVB or VIB metals, wherein said one or more carbides, nitrides, or borides is a compound having the formula MXz, where M is a metal from Group IVB or VIB, X is a carbide, nitride or boride and z has a value >0.97;
      (ii) between about 40 and 80 vol-% of one or more of carbides, nitrides, borides, or oxides of aluminum; and
   (c) between about 3 and 15 wt-% tungsten.

7. The process of claim 6, wherein said HP/HT conditions include a pressure of between about 45 and 50 kbars, and a temperature of between about 1400* C for a time ranging from between about 30 and 40 minutes.

8. The process of claim 6, wherein the ceramic binder phase predominantly comprises titanium carbide.

9. The process of claim 6, where the tungsten content is between about 3 and 8 wt-%.

10. The process of claim 6, wherein said ceramic binder phase includes $TiB_2$, which $TiB_2$ is detectable by XRD.

11. The process of claim 10, wherein the mixture also contains WB, wherein the XRD Intensity Ratio of the [101] $TiB_2$ peak to the [110] WB peak is less than about 0.4.

12. A method for a machining chemically reactive material, which comprises:
   contacting a chemically reactive material with a sintered cubic boron nitride (cBN) compact far removing at least a portion of said material, said cBN compact comprising:
   (a) between about 60 and 80 vol -% cBN having a volumetric mean particle size of between about 3 to 6 μm;
   (b) between about 20 and 40 vol-% of a ceramic binder phase, of which
      (i) between about 20 and 60 vol-% of one or more of carbides, nitrides, or borides of a Group IVB or VIB metals, wherein said one or more carbides, nitrides, or borides is a compound having the formula MXz, where M is a metal from Group IVB or VIB, X is a carbide, nitride or boride and z has a value >0.97;
      (ii) between about 40 and 80 vol-% of one or more of carbides, nitrides, borides, or oxides of aluminum; and
   (c) between about 3 and 15 wt-% tungsten.

13. The method of claim 12, wherein said chemically reactive material comprises a ferrous workpiece.

14. The method of claim 12, wherein the ceramic binder phase (b)(i) predominantly is titanium carbide.

15. The method of claim 12, where the tungsten content is between about 3 and 8 wt-%.

16. The method of claim 12, wherein said ceramic binder phase includes $TiB_2$, which $TiB_2$ is detectable by XRD.

17. The method of claim 16, wherein the compact also contains WB, wherein the XRD Intensity Ratio of the [101] $TiB_2$ peak to the [110] WB peak is less than about 0.4.

18. An article in the form of a cutting tool, a drill bit, or a dressing tool comprising the cBN compact of claim 1.

19. The sintered cBN compact of claim 1, wherein X of the compound of the ceramic binder phase having the formula MXz further comprises a mixture of carbides, nitrides or borides.

* * * * *